United States Patent
Li et al.

(10) Patent No.: US 10,528,751 B2
(45) Date of Patent: Jan. 7, 2020

(54) SECURE AND EFFICIENT CLOUD STORAGE WITH RETRIEVABILITY GUARANTEES

(71) Applicant: NEC Europe Ltd., Heidelberg (DE)

(72) Inventors: Wenting Li, Heidelberg (DE); Ghassan Karame, Heidelberg (DE)

(73) Assignee: NEC CORPORATION, Tokyo (JP)

(*) Notice: Subject to any disclaimer, the term of this patent is extended or adjusted under 35 U.S.C. 154(b) by 203 days.

(21) Appl. No.: 15/486,319

(22) Filed: Apr. 13, 2017

(65) Prior Publication Data

US 2018/0300493 A1    Oct. 18, 2018

(51) Int. Cl.
| | | |
|---|---|---|
| *H04L 29/06* | (2006.01) | |
| *G06F 21/62* | (2013.01) | |
| *H04L 9/08* | (2006.01) | |
| *G06F 21/64* | (2013.01) | |
| *G06F 21/60* | (2013.01) | |
| *G06F 16/23* | (2019.01) | |

(52) U.S. Cl.
CPC ...... *G06F 21/6218* (2013.01); *G06F 16/2365* (2019.01); *G06F 21/602* (2013.01); *G06F 21/64* (2013.01); *H04L 9/0861* (2013.01)

(58) Field of Classification Search
CPC .... G06F 21/6218; G06F 21/602; G06F 21/64; G06F 17/30371; H04L 9/3247; H04L 9/0861; H04L 9/0618; H04L 2209/04; H04L 2209/08

See application file for complete search history.

(56) References Cited

U.S. PATENT DOCUMENTS

| | | | | |
|---|---|---|---|---|
| 8,416,954 B1* | 4/2013 | Raizen | ............... | H04L 63/0428 380/277 |
| 2014/0189348 A1* | 7/2014 | El-Shimi | ............. | G06F 21/6218 713/165 |
| 2014/0281486 A1* | 9/2014 | Nayshtut | ............. | G06F 21/6227 713/153 |

(Continued)

FOREIGN PATENT DOCUMENTS

| | | |
|---|---|---|
| CN | 105939191 A | 9/2016 |
| WO | WO 2015173434 A1 | 11/2015 |

(Continued)

OTHER PUBLICATIONS

Mihir Bellare, Sriram Keelveedhi and Thomas Ristenpart, "DupLESS: Server-Aided Encryption for Deduplicated Storage", USENIX Security Symposium, 2013, pp. 1-16 (Year: 2013).*

(Continued)

*Primary Examiner* — Joseph P Hirl
*Assistant Examiner* — Chi D Nguy
(74) *Attorney, Agent, or Firm* — Leydig, Voit & Mayer, Ltd.

(57) ABSTRACT

A method for secure cloud storage of user data includes deriving, using content of the user data and a secret key stored by a server, an encryption key, encrypting, using the derived encryption key, the user data to provide encrypted user data, applying an all-or-nothing transform on the encrypted user data to produce blocks of transformed encrypted user data, partitioning the blocks of transformed encrypted user data to data partitions, creating, for each of the data partitions, an authenticator, and performing data deduplication on the transformed encrypted user data.

19 Claims, 2 Drawing Sheets

(56) References Cited

U.S. PATENT DOCUMENTS

| | | | |
|---|---|---|---|
| 2015/0288662 A1* | 10/2015 | Bilogrevic | .......... H04L 63/0428 |
| | | | 713/168 |
| 2016/0087790 A1 | 3/2016 | Karame et al. | |
| 2016/0147471 A1 | 5/2016 | O'Hare et al. | |
| 2017/0213047 A1* | 7/2017 | Huang | .................. G06F 21/602 |
| 2018/0034819 A1* | 2/2018 | Yan | ..................... H04L 67/1095 |

FOREIGN PATENT DOCUMENTS

| WO | WO 2016128070 A1 | 8/2016 |
|---|---|---|
| WO | WO 2016180495 A1 | 11/2016 |

OTHER PUBLICATIONS

Ken Beer, "Encrypting Data at Rest", amazon web services, Nov. 2014, pp. 1-20.

\* cited by examiner

SECURE AND EFFICIENT CLOUD STORAGE WITH RETRIEVABILITY GUARANTEES

STATEMENT REGARDING FUNDING

The work leading to this invention has received funding from the European Union's Horizon 2020 Programme under Grant Agreement No. 644412.

FIELD

The present invention relates to cloud storage of user data, and in particular to secure cloud storage of user data with retrievability guarantees.

BACKGROUND

Cloud services for storage, computing services, and collaboration platforms are becoming more relevant, important, and pervasive. However, cloud services also introduce new security threats with respect to the confidentiality and integrity of the data outsourced thereto. Customers of cloud services may lose control over their data and how it is processed or stored. Loss of control over user data has been identified as one of the main obstacles standing in the way of increased adoption of cloud services by users.

Cloud services customers may not trust cloud services providers to encrypt their data due to fear of insider attacks. On the other hand, client-side encryption involves complicated key management and is often vulnerable when such key management fails and the key is leaked, e.g., due to a weak password. Therefore, existing cloud storage services in which simply user data is encrypted and the encryption keys are retained by the user may not afford adequate levels of security.

Furthermore, many cloud services providers currently do not provide service level agreement (SLA) guaranteeing data storage reliability. Currently, integrity and retrievability are not measurable and verifiable metrics for cloud storage services. Additionally, storage efficiency is not a tunable factor for current cloud storage solutions. Cost-saving data deduplication is not supported alongside client-side encryption. Moreover, the cloud cannot provide verifiable duplication of data on behalf of users who desire extra data replication.

State of the art technologies provide individual solutions to each of the above mentioned shortcomings of cloud services. For example, US Patent Application Publication No. 2016/0147471 A1 and U.S. Patent Application Publication No. 2016/087790 A1 use gateways to provide only confidentiality for cloud storage. PCT Publication No. WO 2015/173434 A1 gives a solution for proofs of retrievability and PCT Publication No. WO 2016/180495 describes proofs of retrievability on data replications. PCT Publication No. WO 2016/128070 and Chinese Patent Application Publication CN105939191 A describe de-duplication technology for encrypted data.

SUMMARY

In an embodiment, the present invention provides a method for secure cloud storage of user data. The method includes deriving, using content of the user data and a secret key stored by a server, an encryption key, encrypting, using the derived encryption key, the user data to provide encrypted user data, applying an all-or-nothing transform on the encrypted user data to produce blocks of transformed encrypted user data, partitioning the blocks of transformed encrypted user data to data partitions, creating, for each of the data partitions, an authenticator, and performing data deduplication on the transformed encrypted user data.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
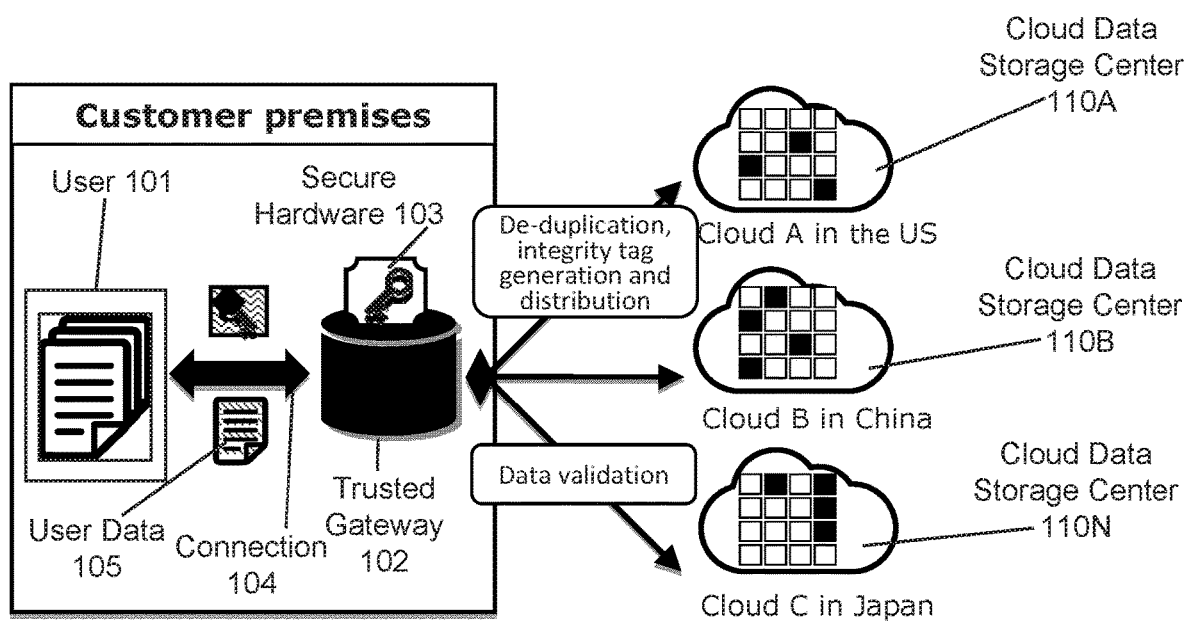
FIG. 1 is a block diagram depicting a network environment in which a method according to an embodiment of the invention can be executed.

The aforementioned state of the art solutions to individual shortcomings of cloud services do not represent a compound solution that can simultaneously provide solutions to multiple shortcomings as each technology hinders some feature of the others.

A complete solution is described herein for users to outsource their data to the cloud in a secure, reliable, and efficient manner that enables deduplication on authentication tags used to validate the retrievability of the outsourced data. A privacy-preserving content-based server-aided key generation routine to acquire an encryption key for user data is described herein. This not only solves the problem of complicated key management issues, but also enables data-deduplication on client-side encrypted data. Confidentiality of user data can be protected through an all-or-nothing transform on said client-side encrypted data. The acquired encryption key can be used to derive the keys used to generate authenticators for the outsourced data so that the authenticators used for proof of retrievability can also be de-duplicated. Data retrievability guarantees afforded by the solution described herein can also cover the case where a user requests that multiple copies of data be kept in the cloud.

A system according to an embodiment of the invention includes a trusted gateway that resides at customer premises and connects to multiple clouds. The trusted gateway is equipped with Trusted Execution Environments (TEE), such as SGX or Trustzone, to ensure that all of its secret credentials will be protected from adversaries/malware even if the gateway itself is compromised. The gateway can connect to available clouds and thereby complement a secure cloud storage solution.

In methods and systems according to a first embodiment of the invention, all data is entangled together in all or nothing encryption mode which supports full data deduplication at the file level and basic proofs of retrievability where the authenticator tags can be de-duplicated or merged are combined therewith. In methods and systems according to a second embodiment of the invention which builds on the first embodiment, robustness is enhanced by allowing the cloud to replicate the data and enabling proofs of retrievability on the replicated data.

A procedure by which a user can upload a file to the cloud is described as follows. A user plans to outsource data $D_u$ to the cloud. The user communicates with the trusted gateway directly, which connects to n cloud storage servers on the other side. The user is provided with an encryption key through a server-aided, or gateway-aided, key generation with blind signatures. The user first interacts with the gateway to acquire the encryption key. The user blinds its data with a random mask r and sends the blinded data $B_u=B(D_u, r)$ to the gateway. The gateway uses a secret key K which is protected in the TEE to sign the blinded data and provide $sig(K, B_u)$, which it sends back to the user. The user removes the mask from the signature and acquires the encryption key based on the unmasked signature: $K_e=sig(K, D_u)$. This process ensures that users will acquire the same encryption if their data content is the same. It also guarantees that the gateway is not able to guess or distinguish the data content given the blinded data.

The user then encrypts the data with $K_e$ and applies all-or-nothing transform on the encrypted data. The user uses block cipher E and key $K_e$ to encrypt the data and gets m output blocks $E_1, E_2, \ldots, E_m$. The user applies an all-or-nothing transform on the cipher blocks and gets $E_1', E_2', \ldots, E_m'$. The user cyclic shifts each block with a random seed that derives from $K_e$: $s=PRF("shift", K_e)$ and gets the shifted blocks $E_1'', E_2'', \ldots, E_m''$. The user generates (k,n)-erasure coded partitions for the m permuted blocks and gets $$l = m \times \frac{n}{k}$$

blocks $E_1'', E_2'', \ldots, E_l''$. This process ensures that even if there is an insider attack and the encryption key $K_e$ is leaked, as long as the attacker does not acquire >=k partitions, no information can be disclosed from the compromised data. It also ensures that if there is any data loss or corruption incidents on <=n-k partitions, the user data can be recovered.

The user next generates authenticators for proof of retrievability. The user categorizes l blocks to n partitions. Each partition $$P_i = \left(E''_{1+\frac{i \times l}{n}}, E''_{2+\frac{i \times l}{n}}, \ldots, E''_{\frac{(i+1) \times l}{n}}\right)$$

is dedicated to one cloud. The user then generates credentials in order to create authenticators of the data partitions for proofs of retrievability. The user can either i) derive the credentials from the encryption key $K_e$, so that the gateway is able to de-duplicate the authenticators along with the encrypted data; or ii) use secret credentials to generate unique authenticators, while the clouds are able to merge the authenticators from different users through key-message homomorphic encryption. If the user chooses to derive the credentials from the encryption key $K_e$, so that the gateway is able to de-duplicate the authenticators, the process can proceed to include the authenticators in the processed data blocks. If the user instead chooses to use secret credentials to generate unique authenticators, while the clouds are able to merge the authenticators, the user can create unique authenticators $\sigma_r^i$ for each block r in each partition i, and sends the authenticators to the gateway. This process creates authenticators that can either be de-duplicated along with the user data, or merged with other authenticators from different users. The authenticators are used in the data validation process for the gateway to verify if there is any data corruption or data loss incidents in the cloud.

Data deduplication can thereafter be performed on the user data. First, the user generates an ID based on the processed data blocks through a deterministic content-based algorithm. Next, the user sends the ID to the gateway as a request to upload the data. Then, the gateway checks if there is already a file with the same ID that has been uploaded before. If so, the user is asked to provide proof of ownership of the data to the gateway. If not, the gateway asks the user to send the data. If the data is de-duplicated, the gateway adds the user in the ownership list of the uploaded file. If the data is not de-duplicated, the gateway asks the user to send the data to the clouds. If the data is de-duplicated while the authenticators are unique, the gateway will additionally send the authenticators to the clouds, who then merge them with those generated by other users.

Data validation can also be provided by the gateway. After the data is uploaded to the clouds, the gateway can always verify the retrievability of the data in the cloud by sending a challenge vector on randomly chosen blocks. In case a data partition is corrupted or lost, the gateway is able to detect it in the validation process and recover that partition using those from other clouds.

The gateway can further perform data retrieval from the clouds to provide the user to the user upon request. The gateway checks user's ownership and downloads the data partitions on behalf of the user. The gateway removes the replicated partitions and sends the reconstructed data $E_1'', E_2'', \ldots, E_m''$ to the user. The user derives the random seed for cyclic shift: $s=PRF("shift", K_e)$ and acquires ordered encrypted data blocks $E_1', E_2', \ldots, E_m'$. Finally the user reverses the all-or-nothing transform and decrypts the data using $K_e$ and retrieves the original data $D_u$.

The robustness of the cloud storage can be enhanced by applying proofs of retrievability over data replications. Authenticators for proof of retrievability over data replication can be generated. The user categorizes l blocks to n partitions, where each partition can be expressed as $$P_i = \left(E''_{1+\frac{i \times l}{n}}, E''_{2+\frac{i \times l}{n}}, \ldots, E''_{\frac{(i+1) \times l}{n}}\right).$$

For each partition, the user generates a verification tag τ and a copy parameter Π based on the partition $P_i$ and a derived key $K_\Pi=PRF$ (replica, i, $K_e$). The user can then perform a data de-duplication process on the data partitions $P_i$ and the copy parameters Π. If the data is not de-duplicated, it will be uploaded to the clouds who then output r copies for each partition $P_i^1, \ldots, P_i^r$. The verification tag τ can be managed by the gateway to validate the data replications in the future.

FIG. 1 is a block diagram depicting a network environment in which a method according to an embodiment of the invention can be executed. In the network environment depicted in FIG. 1, a user 101 and a trusted gateway 102 are located at customer premises 100. The user 101 can be a physical computing device including a processor, a processor core, or a plurality of processors or processor cores configured to execute processor executable instructions or an application running on such a physical computing device. The trusted gateway 102 can also be a physical computing device including a processor, a processor core, or a plurality of processors or processor cores configured to execute processor executable instructions or an application running on such a physical computing device. The trusted gateway 102 can be referred to as a server. The user 101 and the trusted gateway 102 can both be located at the same physical computing device including a processor, a processor core, or a plurality of processors or processor cores configured to execute processor executable instructions. The trusted gateway 102 includes secure hardware 103. The secure hardware 103 can be a secure area of a processor or processor core of the trusted gateway 102. The secure hardware 103 can be a trusted execution environment (TEE) that guarantees code and data loaded inside to be protected with respect to confidentiality and integrity. A connection 104 between the user 101 and the trusted gateway 102 allows the user to transmit user data 105 to the trusted gateway 102. The trusted gateway 102 is connected to a plurality of cloud data storage centers 110A through 110N.

Figure 2:
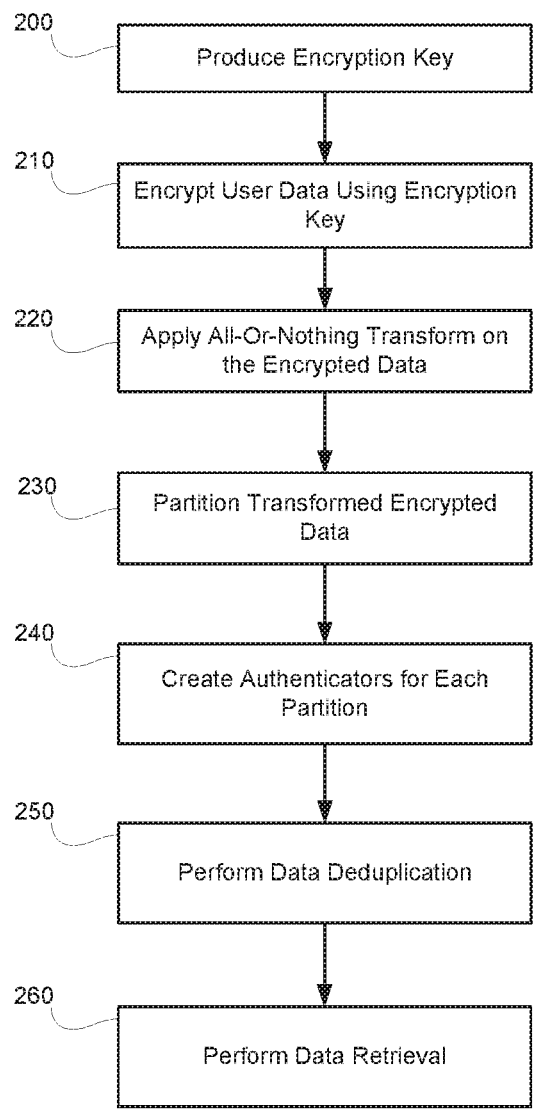
FIG. 2 is a flow chart depicting a process for secure cloud data storage according to an embodiment of the invention.

FIG. 2 is a flow chart depicting a process for secure cloud data storage according to an embodiment of the invention. The process for secure cloud data storage depicted in FIG. 2 can be executed by a processor, a processor core, or a plurality of processors or processor cores configured to execute processor executable instructions. For example, the trusted gateway 102 of FIG. 1 can include a processor, a processor core, or a plurality of processors or processor cores configured to execute processor executable instructions for performing the process depicted in FIG. 2.

At 200, an encryption key is produced. The encryption key can be produced using a server-aided, or gateway-aided, key generation with blind signatures. First a user can blind its data with a random mask r and send the blinded data $B_u = B(D_u, r)$ to the gateway. The gateway can then use a secret key K which is protected in a TEE to sign the blinded data and provide a masked signature $sig(K, B_u)$, which it sends back to the user. The user can then remove the mask from the signature to produce an unmasked signature and can thereafter produce the encryption key based on the unmasked signature: $K_e = sig(K, D_u)$.

At 210, data is encrypted using the encryption key produced at 200. The user can use a block cipher E and key $K_e$ to encrypt the data and produce m output blocks $E_1, E_2, \ldots, E_m$ of encrypted data. At 220, an all-or-nothing transform is applied on the encrypted data. The all-or-nothing transform can be applied to the blocks $E_1, E_2, \ldots, E_m$ of encrypted data in order to provide output blocks $E_1', E_2', \ldots, E_m'$ of transformed encrypted data. In particular, each block can be shifted with a random seed that derives from the encryption key $K_e$, $s = PRF(\text{"shift"}, K_e)$ to provide cyclic shifted blocks $E_1'', E_2'', \ldots, E_m''$ of transformed encrypted data. At 230, the cyclic-shifted blocks of transformed encrypted user data is portioned into data partitions. The cyclic-shifted blocks of transformed encrypted user data can be portioned into erasure-coded partitions. In particular, the process can generate (k,n)-erasure coded partitions for the m permuted blocks to produce $$l = m \times \frac{n}{k}$$

blocks $E_1'', E_2'', \ldots, E_l''$ erasure-coded blocks.

At 240, the process creates authenticators for each partition. The process can categorize, or assign, the l erasure-coded blocks to n partitions. Each partition $$P_i = \left( E''_{1 + \frac{i \times l}{n}}, E''_{2 + \frac{i \times l}{n}}, \ldots, E''_{\frac{(i+1) \times l}{n}} \right)$$

can be dedicated to, e.g. assigned to be transmitted to, one cloud. The user then generates credentials in order to create authenticators of the data partitions for proof of retrievability. According to a first example of the process depicted in FIG. 2, the process can derive the credentials from the encryption key $K_e$, so that the gateway is able to de-duplicate the authenticators along with the encrypted data. Alternatively, in a second example of the process depicted in FIG. 2, the process can use secret credentials to generate unique authenticators. Where the process generates unique authenticators, the clouds can merge the authenticators from different users through key-message homomorphic encryption. If the process derives the credentials from the encryption key $K_e$, the gateway can de-duplicate the authenticators as the authenticators, like the encryption key, are specific to the user content. If the process instead uses secret credentials to generate unique authenticators, the clouds can merge the authenticators. For example, the process can create unique authenticators $\sigma_r^i$ for each block r in each partition i, and send the authenticators to the gateway.

At 250, data deduplication can be performed on the user data to be securely stored in the cloud. First, at 250, the process can generate an ID based on the processed data blocks through a deterministic content-based algorithm. Next, the process can send the ID to the gateway as a request to upload the data. Then, the gateway can check if there is already a file with the same ID that has been uploaded before. If so, the gateway can request the user provide proof of ownership of the data. If not, the gateway can request that the user transmit the data to the gateway. If the data is de-duplicated, the gateway can add the user in an ownership list of the uploaded file. If the data is not de-duplicated, the gateway can request that the user send the data to the clouds. If the data is de-duplicated while the authenticators are unique, the gateway can send the authenticators to the clouds, who can then merge them with those generated by other users.

At 260, the process can perform data retrieval from the clouds to provide the user data to the user upon request. At 260, the gateway can check a user's ownership and download data partitions on behalf of the user. The gateway can remove replicated partitions and send the reconstructed data $E_1'', E_2'', \ldots, E_m''$ to the user. The user can derive the random seed for cyclic shift: $s = PRF(\text{"shift"}, K_e)$ and acquires ordered encrypted data blocks $E_1', E_2', \ldots, E_m'$. The process can then reverse the all-or-nothing transform and decrypt the data using $K_e$ and retrieve the original data $D_u$.

Embodiments of the present invention can provide customers with the assurance that the sensitive data they store onto existing clouds will remain highly protected, even if the encryption keys are leaked to a powerful adversary. Moreover, embodiments of the present invention can guarantee customers that their data is always retrievable without any modification, even when facing malicious cloud administrators, and is automatically repaired in case of any partial data loss. Embodiments of the present invention can enables deduplication of all or nothing encryption and can distribute the deduplicated shares after pseudorandom shifting and erasure coding. Finally, embodiments of the present invention can provide security guarantees that cannot be offered by any state of the art solution—including costly solutions provided by in-house secure datacenters.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for secure cloud storage of user data, comprising:
    deriving, using content of the user data and a secret key stored by a server, an encryption key;
    encrypting, using the derived encryption key, the user data to provide encrypted user data;
    applying an all-or-nothing transform on the encrypted user data to produce blocks of transformed encrypted user data;
    partitioning the blocks of transformed encrypted user data to data partitions;
    creating, for each of the data partitions, an authenticator; and
    performing data deduplication on the transformed encrypted user data and the authenticators.

2. The method of claim 1, wherein the secret key stored by the server is protected in a trusted execution environment (TEE) located at the server.

3. The method of claim 2, wherein the deriving, using content of user data and a secret key stored by a server, an encryption key comprises:
    blinding user data with a random mask to produce blinded user data;
    signing, using the secret key, the blinded user data to produce a masked signature;
    removing the random mask from the signature to produce an unmasked signature;
    acquiring the encryption key from the unmasked signature.

4. The method of claim 1, wherein the encrypting, using the derived encryption key, the user data to provide encrypted user data comprises using a block cipher and the encryption key to provide blocks of encrypted data.

5. The method of claim 4, wherein the applying an all-or-nothing transform on the encrypted user data to produce blocks of transformed encrypted user data comprises:
    deriving a random seed from the encryption key;
    cyclic shifting each block of the blocks of encrypted data with the random seed to produce the blocks of transformed encrypted user data.

6. The method of claim 1, wherein partitioning the blocks of transformed encrypted user data to data partitions comprises generating erasure-coded partitions for the blocks of transformed encrypted user data.

7. The method of claim 1, further comprising dedicating each of the data partitions to a separate cloud.

8. The method of claim 1, wherein creating, for each of the data partitions, an authenticator comprises:
    generating, using the encryption key, credentials for each block of the transformed encrypted user data; and
    creating, using the credentials for each block of the transformed encrypted user data, an authenticator for each of the data partitions.

9. The method of claim 1, wherein creating, for each of the data partitions, an authenticator comprises:
    generating, using secret credentials, secret credentials for each block of the transformed encrypted user data; and
    creating, using the secret credentials for each block of the transformed encrypted user data, a unique authenticator for each of the data partitions.

10. The method of claim 1, wherein the performing data deduplication on the transformed encrypted user data and the authenticators comprises:
    generating an ID based on the processed data blocks through a deterministic content-based algorithm;
    sending the ID as a request to upload data; and
    determining whether a file with the same ID has previously been uploaded.

11. The method of claim 10, wherein if a file with the same ID has previously been uploaded, the performing data deduplication on the transformed encrypted user data and the authenticators further comprises:
    receiving a proof of ownership of the data; and
    adding a user from whom the proof of ownership was provided to an ownership list corresponding to the file.

12. The method of claim 10, wherein if a file with the same ID has previously been uploaded, the performing data deduplication on the transformed encrypted user data and the authenticators further comprises:
    receiving a proof of ownership of the data and unique authenticators for each of the data partitions;
    adding a user from whom the proof of ownership was provided to an ownership list corresponding to the file;
    sending each authenticator to the cloud storage where the copy of the duplicated data partition was stored; and
    merging, by the cloud storage, the received authenticator with the existing authenticator of the data partition.

13. The method of claim 12, wherein merging, by the cloud storage, the received authenticator with the existing authenticator of the data partition is performed with key-message homomorphic encryption.

14. The method of claim 1, further comprising:
    receiving a request to provide the user data;
    removing the data partitions to provide reconstructed transformed encrypted user data; and
    transmitting the reconstructed transformed encrypted user data.

15. The method of claim 14, wherein the encrypting, using the derived encryption key, the user data to provide encrypted user data comprises using a block cipher and the encryption key to provide blocks of encrypted data, wherein the applying an all-or-nothing transform on the encrypted user data to produce blocks of transformed encrypted user data comprises deriving a random seed from the encryption key, and cyclic shifting each block of the blocks of encrypted data with the random seed to produce the blocks of transformed encrypted user data, the method further comprising:

ordering, using the random seed, the reconstructed transformed encrypted user data;

reversing the all or nothing-nothing transform on the ordered reconstructed transformed encrypted user data; and decrypting, using the encryption key, the reversed ordered reconstructed transformed encrypted user data to obtain the user data.

16. One or more processors having stored thereon processor executable instructions for performing secure cloud storage of user data, the instructions comprising instruction for:

deriving, using content of the user data and a secret key stored by a server, an encryption key;

encrypting, using the derived encryption key, the user data to provide encrypted user data;

applying an all-or-nothing transform on the encrypted user data to produce blocks of transformed encrypted user data;

partitioning the blocks of transformed encrypted user data to data partitions;

creating, for each of the data partitions, an authenticator; and performing data deduplication on the transformed encrypted user data.

17. The one or more processors of claim 16, the instructions further comprising instructions for:

receiving a request to provide the user data;

removing the data partitions to provide reconstructed transformed encrypted user data; and transmitting the reconstructed transformed encrypted user data.

18. A method, executed by a trusted gateway, for secure cloud storage of user data, the method comprising:

receiving, from a user computing device, encrypted user data, wherein the encrypted user data is encrypted with an encryption key, wherein the encryption key is produced using a secret key stored in a trusted execution environment (TEE) of the trusted gateway;

applying an all-or-nothing transform on the encrypted user data to produce blocks of transformed encrypted user data;

partitioning the blocks of transformed encrypted user data to data partitions;

creating, for each of the data partitions, an authenticator;

performing data deduplication on the transformed encrypted user data and the authenticators; and transmitting, to a plurality of cloud data storage centers, the data partitions.

19. The method of claim 18, wherein the encryption key is produced by the user computing device in a process that includes:

blinding, by the user computing device, unencrypted user data with a mask to produce blinded unencrypted user data, transmitting, by the user computing device to the trusted gateway, the blinded unencrypted user data, signing, by the trusted gateway, the blinded unencrypted user data with the secret key to provide a masked signature, transmitting, by the trusted gateway to the user computing device, the masked signature, removing, by the user computing device, the mask to produce an unmasked user signature, and producing, by the user computing device, the encryption key based on the unmasked signature.

\* \* \* \* \*